United States Patent
Liu et al.

(10) Patent No.: US 11,480,817 B2
(45) Date of Patent: Oct. 25, 2022

(54) COPLANAR WAVEGUIDE TRANSMISSION LINE AND SILICON-BASED ELECTRO-OPTIC MODULATOR COMPRISING THE SAME

(71) Applicant: SiFotonics Technologies Co., Ltd., Grand Cayman (KY)

(72) Inventors: Yadong Liu, Beijing (CN); Pengfei Cai, Beijing (CN); Tzung-I Su, Taoyuan (TW); Dong Pan, Andover, MA (US)

(73) Assignee: SiFotonics Technologies Co., Ltd.

( * ) Notice: Subject to any disclaimer, the term of this patent is extended or adjusted under 35 U.S.C. 154(b) by 48 days.

(21) Appl. No.: 17/194,218

(22) Filed: Mar. 6, 2021

(65) Prior Publication Data
US 2021/0286202 A1 Sep. 16, 2021

(51) Int. Cl.
*G02F 1/025* (2006.01)
*G02F 1/21* (2006.01)
*G02F 1/225* (2006.01)

(52) U.S. Cl.
CPC .............. *G02F 1/025* (2013.01); *G02F 1/212* (2021.01); *G02F 1/2255* (2013.01)

(58) Field of Classification Search
CPC ........ G02F 1/025; G02F 1/212; G02F 1/2255; G02F 2201/063; G02F 1/2257; G02F 1/011; G02F 1/218; G02F 1/0113; G02F 1/217
See application file for complete search history.

(56) References Cited

U.S. PATENT DOCUMENTS

| | | | | |
|---|---|---|---|---|
| 7,054,512 B2 * | 5/2006 | Sugiyama | ............ | G02B 6/1228 385/9 |
| 8,078,015 B2 * | 12/2011 | Sugiyama | ............. | G02F 1/2255 385/14 |
| 8,606,053 B2 * | 12/2013 | Sugiyama | ............. | G02F 1/0305 385/2 |
| 9,423,566 B2 * | 8/2016 | Sugiyama | .......... | H04B 10/5053 |
| 10,228,605 B2 * | 3/2019 | Miyazaki | .............. | G02F 1/2257 |

* cited by examiner

*Primary Examiner* — John Bedtelyon
(74) *Attorney, Agent, or Firm* — Han IP PLLC; Andy M. Han

(57) ABSTRACT

Various embodiments of a coplanar waveguide (CPW) transmission line as well as a silicon-based electro-optic (E-O) modulator comprising the CPW transmission line are described. The CPW transmission line has a curved or winding shape. The silicon-based E-O modulator includes a rib optical waveguide, a beam splitter, a beam combiner, and a CPW transmission line that exhibits the winding shape. At least one of the two optical arms of the rib optical waveguide alternately and periodically extends through a first groove and a second groove of the CPW transmission line. The plurality of active sections of the rib optical waveguide are evenly distributed on both sides of the CPW transmission line to suppress undesired transmission modes. An increased length of transmission path of the rib optical waveguide is also avoided or minimized, thereby reducing the transmission speed mismatch of the E-O modulator, which is essential for achieving high-speed operation.

12 Claims, 7 Drawing Sheets

COPLANAR WAVEGUIDE TRANSMISSION LINE AND SILICON-BASED ELECTRO-OPTIC MODULATOR COMPRISING THE SAME

CROSS-REFERENCE TO RELATED PATENT APPLICATIONS

The present disclosure claims the priority benefit of Chinese Patent Application No. 202010159734.X, filed on Mar. 10, 2020. The aforementioned application is incorporated by reference in its entirety.

TECHNICAL FIELD

The present disclosure relates to the technical field of photoelectric devices. More particularly, the present disclosure relates to a coplanar waveguide transmission line and a silicon-based electro-optic modulator comprising the coplanar waveguide transmission line.

BACKGROUND

The electro-optic bandwidth of a high-speed silicon-based Mach-Zehnder interference (MZI) electro-optic modulator is mainly determined by the following factors: (1) microwave loss of a capacitive load electrode transmission line; (2) transmission speed matching between an optical signal transmitted along an optical waveguide and a microwave signal transmitted along an electrode transmission line; and (3) impedance matching between a transmission line modulation region and a terminal load of the transmission line. In an event that the modulation region of the silicon-based MZI electro-optic modulator is short, the influence of the transmission speed matching on the electro-optic bandwidth is little. However, in an event that the modulation region of the silicon-based MZI electro-optic modulator is rather long, the impact of the transmission speed matching to the electro-optic bandwidth would be more prominent.

The silicon-based MZI electro-optic modulator usually achieves a phase change of an optical signal transmitted in either or both optical arms thereof by making use of a carrier dispersion effect which is able to change the refractive index of an optical waveguide. The optical arms are followed by a beam combiner of the modulator, which enables the modulator to have the intensity of the optical signal changed or otherwise modulated. Since the carrier dispersion effect is rather weak for a high-speed silicon-based MZI electro-optic modulator employing a low driving voltage, a longer modulation region is usually needed. The long modulation region necessitates a careful design of the traveling wave electrode of the silicon-based MZI electro-optic modulator, especially if the modulator is required to operate at high speed. A coplanar waveguide (CPW) transmission line is often selected to be used in high-speed silicon-based MZI electro-optic modulators due to its flexibility in design and its good anti-interference ability. Conventionally, the CPW transmission line is designed to accommodate a P-N junction of the silicon-based MZI electro-optic modulator in one of the two grooves of the CPW transmission line, wherein each of the two grooves is formed between a signal wire and a ground wire of the CPW transmission line. That is, a capacitive load comprising the P-N junction is located in one of the two grooves of the CPW transmission line, whereas the other groove does not accommodate such a load. This results in an unbalanced structure in terms of loading of the CPW transmission line. The unbalanced structure may, to some extent, stimulate transmission modes other than the desired mode to transmit in the CPW transmission line, causing an adverse impact on the electro-optic bandwidth of the silicon-based MZI electro-optic modulator. U.S. Pat. No. 9,223,185 advocates a technical solution to this problem, wherein the P-N junction is divided into a plurality of sections that are alternately arranged in both grooves of a CPW transmission line. This solution, though aimed to suppress the undesired transmission modes, nonetheless causes a larger transmission speed mismatch, i.e., mismatch in transmission speed between the optical signal and the microwave signal of the MZI electro-optic modulator. Specifically, the transmission speed of the microwave signal traveling along the modulation region of the MZI electro-optic modulators is generally faster than that of the optical signal propagating down the modulation region, causing the transmission speed mismatch, another important consideration in the electro-optic bandwidth of the MZI electro-optic modulator as described above. The S-shape layout of the optical waveguide advocated by U.S. Pat. No. 9,223,185 increases the propagation length of the optical transmission path, which exacerbates the transmission speed mismatch.

SUMMARY

An object of the present disclosure is to provide a coplanar waveguide (CPW) transmission line, as well as a silicon-based Mach-Zehnder interference (MZI) electro-optic modulator that employs the CPW transmission line, wherein the silicon-based MZI electro-optic modulator is able to avoid an increased length of the optical transmission path of an optical waveguide so as to reduce transmission speed mismatch of a silicon-based MZI electro-optic modulator while suppressing undesired transmission modes caused by imbalance of a CPW transmission line.

In one aspect, a coplanar waveguide (CPW) transmission line is provided. The CPW transmission line includes a first ground wire, a signal line, a second ground wire, a first groove formed between the first ground wire and the signal line, and a second groove formed between the second ground wire and the signal line. Specifically, the signal line, the first groove and the second groove each exhibits a curved or winding shape, wherein the curved or winding shape is a general S shape or a general Z shape. Each of the first ground wire, the signal line, the second ground wire, the first groove and the second groove includes a respective a first active section, a first transition section, a second active section, and a second transition section, which are arranged to extend periodically and repeatedly in sequence.

In some embodiments, the first active section of the first ground wire, the first active section of the first groove, the first active section of the signal line, the first active section of the second groove, and the first active section of the second ground wire are substantially aligned with each other. Moreover, the first active section of the second ground wire protrudes towards the first active section of the signal line such that a width of the first active section of the first groove is substantially equal to a width of the first active section of the second groove.

In some embodiments, the second active section of the first ground wire, the second active section of the first groove, the second active section of the signal line, the second active section of the second groove, and the second active section of the second ground wire are substantially aligned with each other. Moreover, the second active section of the first ground wire protrudes towards the second active section of the signal line such that a width of the second active section of the first groove is substantially equal to a width of the second active section of the second groove.

In some embodiments, the first transition section of the first ground wire, the first transition section of the first groove, the first transition section of the signal line, the first transition section of the second groove, and the first transition section of the second ground wire are substantially aligned with each other. Moreover, a width of the first transition section of the first groove is substantially equal to a width of the first transition section of the second groove.

In some embodiments, the second transition section of the first ground wire, the second transition section of the first groove, the second transition section of the signal line, the second transition section of the second groove, and the second transition section of the second ground wire are substantially aligned with each other. Moreover, a width of the second transition section of the first groove is substantially equal to a width of the second transition section of the second groove.

In another aspect, a silicon-based electro-optic (E-O) modulator is provided. The silicon-based E-O modulator includes a CPW transmission line as described above, a rib optical waveguide having a first optical arm and a second optical arm, a beam splitter, and a beam combiner. The rib optical waveguide is configured to transmit an optical signal substantially traveling along a main propagation direction. The beam splitter is used to split the optical signal into two beams which are respectively transmitted through the first optical arm and the second optical arm. Specifically, at least one of the first optical arm and the second optical arm includes a plurality of active sections and a plurality of passive sections, with each of the plurality of active sections and each of the plurality of passive sections being arranged alternately along the main propagation direction. Moreover, the first or second optical arm extends through the first groove and the second groove of the CPW transmission line alternately, whereas each of the plurality of active sections is alternately arranged in the first groove and the second groove.

In some embodiments, the silicon-based E-O modulator may further include a silicon-on-insulator substrate that has a silicon substrate, a buried oxide layer and a top silicon layer.

In some embodiments, the beam splitter and the beam combiner may be a multi-mode interferometer or a Y-branch structure.

In some embodiments, each of the plurality of active sections comprises at least one P-N junction or at least one metal-oxide-semiconductor (MOS) capacitor, whereas the plurality of passive sections comprises neither a P-N junction nor a MOS capacitor.

In some embodiments, each of the plurality of active sections may include a P-N junction diode, which has a P-type semiconductor strip and an N-type semiconductor strip. Moreover, any two adjacent P-N junction diodes within the first or second optical arm exhibit opposite P-N polarities.

In some embodiments, the N-type semiconductor strip corresponds to the signal line. In an event that the P-N junction diode is located within the first groove, the P-type semiconductor strip corresponds to the first ground wire. In an event that the P-N junction diode is located within the second groove, the P-type semiconductor strip corresponds to the second ground wire.

In some embodiments, the P-type semiconductor strip corresponds to the signal line. In an event that the P-N junction diode is located within the first groove, the N-type semiconductor strip corresponds to the first ground wire. In an event that the P-N junction diode is located within the second groove, the N-type semiconductor strip corresponds to the second ground wire.

The embodiments of the present disclosure has various beneficial technical effects, including: (1) The CPW transmission line has a curved shape so that the plurality of active sections of the rib optical waveguide are evenly distributed on both sides of the CPW transmission line, thereby suppressing undesired transmission modes that would otherwise be caused by imbalance of the CPW transmission line; (2) An increased length of transmission path of the rib optical waveguide may be avoid or at least minimized, which helps to reduce the transmission speed mismatch between the optical path and the electrical path, thereby achieving high-speed operation of the E-O modulator.

BRIEF DESCRIPTION OF THE DRAWINGS

In order to clearly explain specific embodiments according to the present disclosure or technical solutions according to prior art, a brief description of accompanying drawings required by descriptions on the specific embodiments or the prior art is given below. Obviously, the drawings described as follows illustrate certain embodiments of the present disclosure. For an ordinary one skilled in the art, without any creative work, other drawings may also be derived or otherwise obtained according to these drawings.

DETAILED DESCRIPTION OF THE PREFERRED EMBODIMENTS

Figure 1:
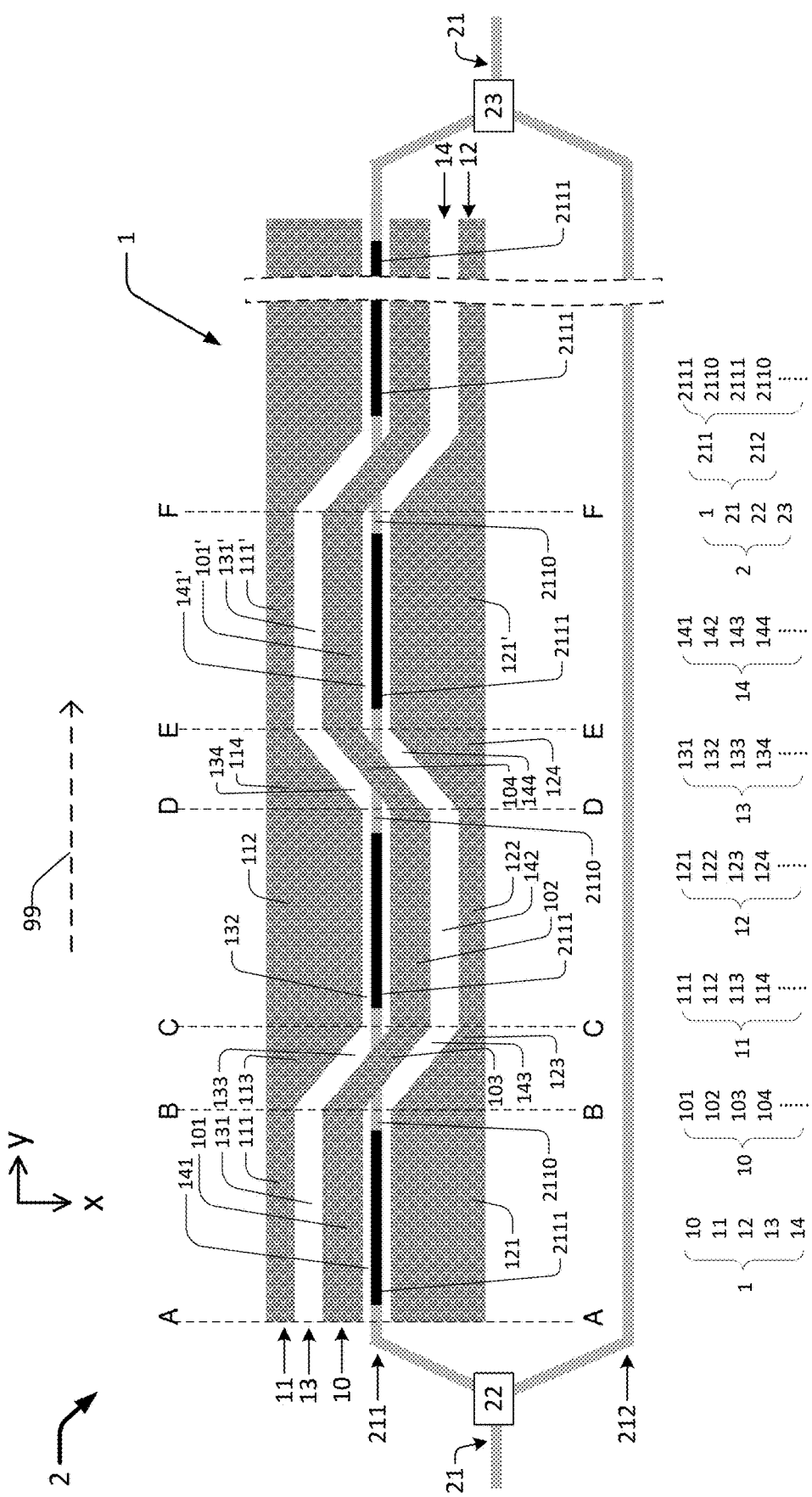
FIG. 1 illustrates a schematic view of a silicon-based electro-optic modulator comprising a curved coplanar waveguide transmission line according to an embodiment of the present disclosure.

Various exemplary embodiments according to the present disclosure are described in detail hereafter and shown in the drawings. In the description with reference to the drawings, the same reference numbers in the drawings denote elements having a same or similar function, unless otherwise stated. Not all of the possible embodiments consistent with the present disclosure are completely introduced. Instead, only several exemplary embodiments are described hereinafter referring to the system examples according to an aspect of the present disclosure or according to the details described in the attached claims.

FIG. 1 illustrates a schematic view of a silicon-based electro-optic (E-O) modulator 2 comprising a curved coplanar waveguide (CPW) transmission line 1 according to one embodiment of the present disclosure. As shown in FIG. 1, the CPW transmission line 1 substantially extends along the y-direction of the Cartesian coordinates denoted in FIG. 1, wherein the y-direction represents a main propagation direction 99 of the silicon-based E-O modulator 2. The CPW transmission line 1 comprises a first ground wire 11, wherein the first ground wire 11 comprises a first active section 111, a second active section 112, a first transition section 113 coupling the first active section 111 with the second active section 112, as well as a second transition section 114 coupling the second active section 112 with a next first active section 111' of the first ground wire 11. Moreover, the first active section 111, the first transition section 113, the second active section 112, and the second transition section 114 are arranged to extend periodically and repeatedly throughout the first ground wire 11. The CPW transmission line 1 further comprises a signal line 10, wherein the signal line 10 comprises a first active section 101, a second active section 102, a first transition section 103 coupling the first active section 101 with the second active section 102, as well as a second transition section 104 coupling the second active section 102 with a next first active section 101' of the signal line 10. Moreover, the first active section 101, the first transition section 103, the second active section 102, and the second transition section 104 are arranged to extend periodically and repeatedly throughout the signal line 10, configured to collectively present the signal line 10 in a curved or otherwise winding shape. The CPW transmission line 1 also comprises a second ground wire 12, wherein the second ground wire 12 comprises a first active section 121, a second active section 122, a first transition section 123 coupling the first active section 121 with the second active section 122, as well as a second transition section 124 coupling the second active section 122 with a next first active section 121' of the second ground wire 12. Moreover, the first active section 121, the first transition section 123, the second active section 122, and the second transition section 124 are arranged to extend periodically and repeatedly throughout the second ground wire 12. The CPW transmission line 1 has a first groove 13 formed between the first ground wire 11 and the signal line 10, wherein the first groove 13 comprises a first active section 131, a second active section 132, a first transition section 133 coupling the first active section 131 with the second active section 132, as well as a second transition section 134 coupling the second active section 132 with a next first active section 131' of the first groove 13. Moreover, the first active section 131, the first transition section 133, the second active section 132, and the second transition section 134 are arranged to extend periodically and repeatedly through the first groove 13, configured to collectively present the first groove 13 in a curved or otherwise winding shape. The CPW transmission line 1 further has a second groove 14 formed between the second ground wire 12 and the signal line 10, wherein the second groove 14 comprises a first active section 141, a second active section 142, a first transition section 143 coupling the first active section 141 with the second active section 142, as well as a second transition section 144 coupling the second active section 142 with a next first active section 141' of the second groove 14. Moreover, the first active section 141, the first transition section 143, the second active section 142, and the second transition section 144 are arranged to extend periodically and repeatedly through the second groove 14, configured to collectively present the second groove 14 in a curved or otherwise winding shape. The signal line 10, the first groove 13 and the second groove 14 are substantially parallel with each other as they meander along the main propagation direction 99 of the silicon-based E-O modulator 2.

According to an embodiment of the present disclosure, the first active section 111 of the first ground wire 11, the first active section 131 of the first groove 13, the first active section 101 of the signal line 10, the first active section 141 of the second groove 14, and the first active section 121 of the second ground wire 12 are arranged to correspond to, or otherwise substantially aligned with, each other between line A-A and line B-B of FIG. 1. Moreover, the first active section 121 of the second ground wire 12 protrudes towards the first active section 101 of the signal line 10 so that the width (i.e., the physical dimension in the x-direction) of the first active section 131 of the first groove 13 is approximately equal to the width of the first active section 141 of the second groove 14.

According to an embodiment of the present disclosure, the second active section 112 of the first ground wire 11, the second active section 132 of the first groove 13, the second active section 102 of the signal line 10, the second active section 142 of the second groove 14, and the second active section 122 of the second ground wire 12 are arranged to correspond to, or otherwise substantially aligned with, each other between line C-C and line D-D of FIG. 1. Moreover, the second active section 112 of the first ground wire 11 protrudes towards the second active section 102 of the signal line 10 so that the width of the second active section 132 of the first groove 13 is approximately equal to the width of the second active section 142 of the second groove 14.

According to an embodiment of the present disclosure, the first transition section 113 of the first ground wire 11, the first transition section 133 of the first groove 13, the first transition section 103 of the signal line 10, the first transition section 143 of the second groove 14, and the first transition section 123 of the second ground wire 12 are arranged to correspond to, or otherwise substantially aligned with, each other between line B-B and line C-C of FIG. 1. Moreover, the width of the first transition section 133 of the first groove 13 is approximately equal to the width of the first transition section 143 of the second groove 14.

According to an embodiment of the present disclosure, the second transition section 114 of the first ground wire 11, the second transition section 134 of the first groove 13, the second transition section 104 of the signal line 10, the second transition section 144 of the second groove 14, and the second transition section 124 of the second ground wire 12 are arranged to correspond to, or otherwise substantially aligned with, each other between line D-D and line E-E of FIG. 1. Moreover, the width of the second transition section 134 of the first groove 13 is approximately equal to the width of the second transition section 144 of the second groove 14.

According to an embodiment of the present disclosure, the curved or winding shape of the signal line 10, the first groove 13, and the second groove 14 comprises a general S shape or a general Z shape. The width of the first groove 13 is substantially equal to the width of the second groove 14 throughout the curved or winding shape. In some embodiments, the electrode material of the CPW transmission line 1 comprises aluminum or copper.

As shown in FIG. 1, the silicon-based E-O modulator 2 further comprises a rib optical waveguide 21, a beam splitter 22, and a beam combiner 23. Specifically, the rib optical waveguide 21, having a first optical arm 211 and a second optical arm 212, is configured to transmit an optical signal. The beam splitter 22 is configured to split the optical signal transmitted in the rib optical waveguide 21 into two beams which are respectively transmitted through the first optical arm 211 and the second optical arm 212 along the main propagation direction 99. The first optical arm 211 comprises a plurality of active sections 2111 and a plurality of passive sections 2110, wherein the plurality of active sections 2111 and the plurality of passive sections 2110 are arranged alternately and periodically along the main propagation direction 99. The beam combiner 23 is configured to combine the two beams transmitted in the first optical arm 211 and the second optical arm 212 into one beam. It is to be noted that the first optical arm 211 extends through the first groove 13 and the second groove 14 of the CPW transmission line 1 alternately, resulting in the plurality of active sections 2111 of the first optical arm 211 being arranged in the first active section 141 of the second groove 14 and the second active section 132 of the first groove 13 alternately. In addition, the plurality of passive sections 2110 of the first optical arm 211 cross the signal line 10 underneath the first transition section 103 and the second transition section 104 of the signal line 10 alternately.

According to an embodiment of the present disclosure, the silicon-based E-O modulator 2 may be a high-speed silicon-based Mach-Zehnder interference (MZI) E-O modulator. The beam splitter 22 may be a multi-mode interferometer (MMI) or a Y-branch structure. Similarly, the beam combiner 23 may be a MMI or a Y-branch structure.

According to an embodiment of the present disclosure, each of the plurality of active sections 2111 may comprise at least one P-N junction or at least one metal-oxide-semiconductor (MOS) capacitor. Each of the plurality of active sections 2111 may have a length in a range of 50 micrometers (um) to 1000 um, and the plurality of active sections 2111 may comprise 2 to 20 individual active section 2111. The passive sections 2110 comprise neither a P-N junction nor a MOS capacitor, and the plurality of passive sections may comprise 2 to 20 individual passive section 2110.

Figure 2:
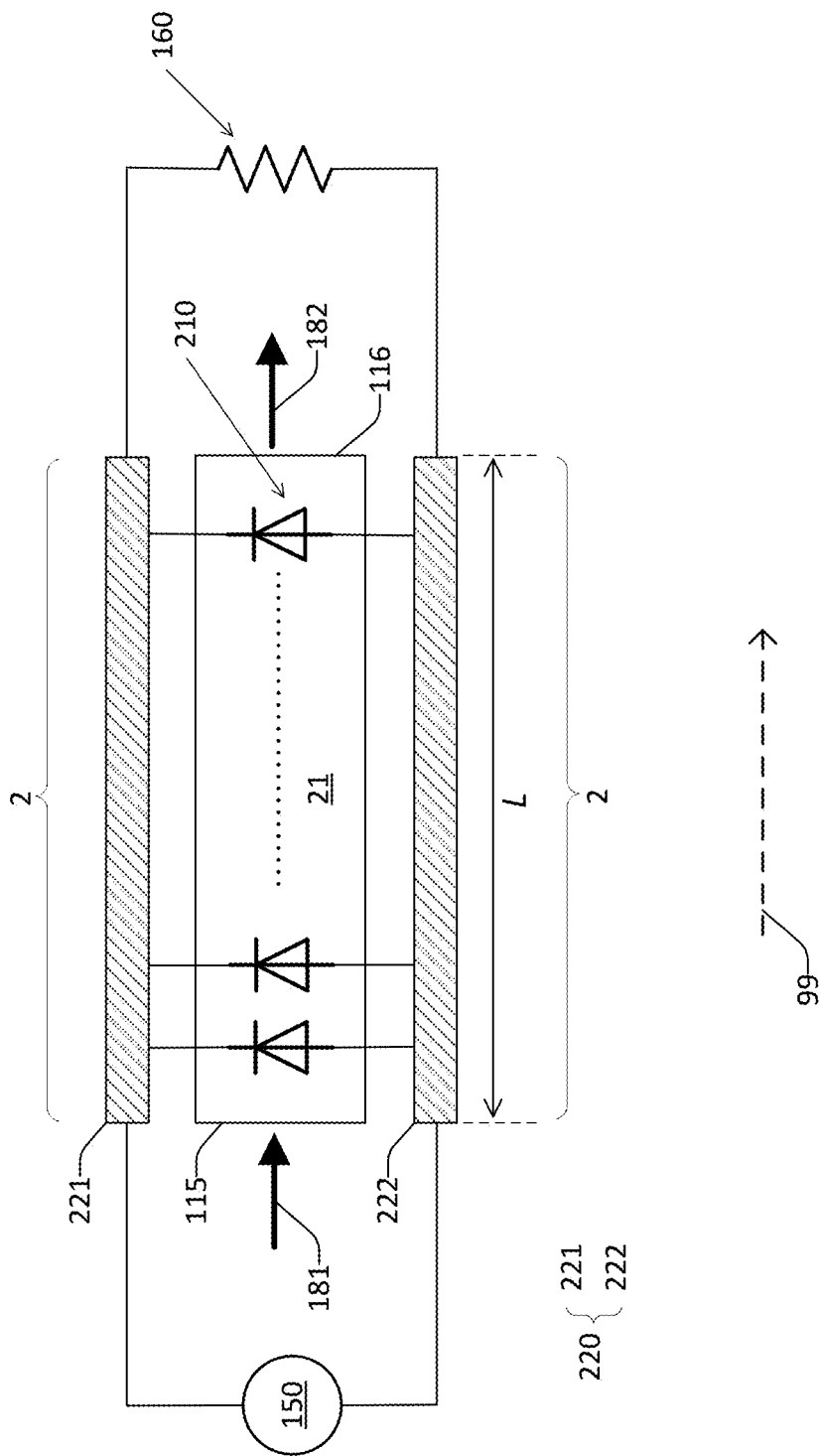
FIG. 2 illustrates a schematic view of a silicon-based electro-optic modulator driven by an electrical modulation signal according to an embodiment of the present disclosure.

FIG. 2 illustrates a schematic view of the silicon-based E-O modulator 2 driven by an electrical modulation signal according to an embodiment of the present disclosure. As shown in FIG. 2, the silicon-based E-O modulator 2 is driven by a voltage source 150 at the input terminal of the silicon-based E-O modulator 2 and is connected to a load 160 at the output terminal of the silicon-based E-O modulator 2. The silicon-based E-O modulator 2 comprises a rib optical waveguide 21, of which the length is "L" along the main propagation direction 99. The rib optical waveguide 21 is configured to allow an optical signal to propagate from a first end 115 of the rib optical waveguide 21 to a second end 116 of the rib optical waveguide 21 along the main propagation direction 99. In FIG. 2, an arrow 181 represents the optical signal as the optical signal enters the rib optical waveguide 21, whereas an arrow 182 represents the optical signal when the optical signal exits the rib optical waveguide 21. The rib optical waveguide 21 may have one or more optical arms in which the optical signal propagates.

The silicon-based E-O modulator 2 further comprises a transmission line 220 for receiving the electrical modulation signal generated by the voltage source 150. In various embodiments of the present disclosure, the transmission line 220 may comprise two or more electrical conductors. Each of the two or more electrical conductors extends in parallel with the rib optical waveguide 21 along the main propagation direction 99. As shown in FIG. 2, the transmission line 220 comprises an electrical conductor 221 and an electrical conductor 222, each of which has substantially the same length as the rib optical waveguide 21. In some exemplary embodiments of the present disclosure, the electrical conductor 221 and the electrical conductor 222 are configured to form a CPW transmission line. For the CPW transmission line 1 shown in FIG. 1, the electrical conductor 222 may be either or both of the first ground wire 11 and the second ground wire 12, and the electrical conductor 221 may be the signal line 10.

The voltage source 150 generates the electrical modulation signal which is used to modulate the optical signal transmitted in the rib optical waveguide 21. Specifically, the electrical modulation signal enables the silicon-based E-O modulator 2 to change an intensity, a phase, or both, of the optical signal. The electrical modulation signal is coupled to the transmission line 220 by connecting a first end of the transmission line 220 to the voltage source 150, wherein the first end of the transmission line 220 is aligned with the first end 115 of the rib optical waveguide 21. Specifically, the voltage source 150 has two terminals, which are electrically connected to a first end of the electrical conductor 221 and a first end of the electrical conductor 222, respectively. The second end of the transmission line 220 is electrically connected to the load 160, wherein the second end of the transmission line 220 is aligned with the second end 116 of the rib optical waveguide 21. The load 160 also has two terminals which are electrically connected to a second end of the electrical conductor 221 and a second end of the electrical conductor 222, respectively. The electrical modulation signal is transmitted from the first end of the transmission line 220 to the second end of the transmission line 220, and then is absorbed by the load 160.

The rib optical waveguide 21 comprises a plurality of P-N junction diodes 210. The plurality of P-N junction diodes 210 are integrated in the rib optical waveguide 21 and are distributed along the main propagation direction 99. The plurality of P-N junction diodes 210 are arranged in parallel with each other between the electrical conductor 221 and the electrical conductor 222, so that the electrical modulation signal transmitted in the transmission line 220 provides a bias voltage for the plurality of P-N junction diodes 210 as the electrical modulation signal travels from the voltage source 150 to the load 160. For example, the electrical modulation signal may be a sinusoidal wave signal with a time-varying radio frequency (RF) component and a constant direct-current (DC) component. Depending on the specific waveform of the electrical modulation signal, each of the plurality of P-N junction diodes 210 is respectively biased with either a forward bias voltage, a zero bias voltage, or a reverse bias voltage at any given time as the electrical modulation signal travels along the rib optical waveguide 21. That is, at any given time, each of the plurality of P-N junction diodes 210 may be biased by the electrical modulation signal at a respectively different bias voltage. Moreover, any given one of the plurality of P-N junction diodes 210 may be biased at various bias voltages at various time according to the specific waveform of the electrical modulation signal.

Figure 3:
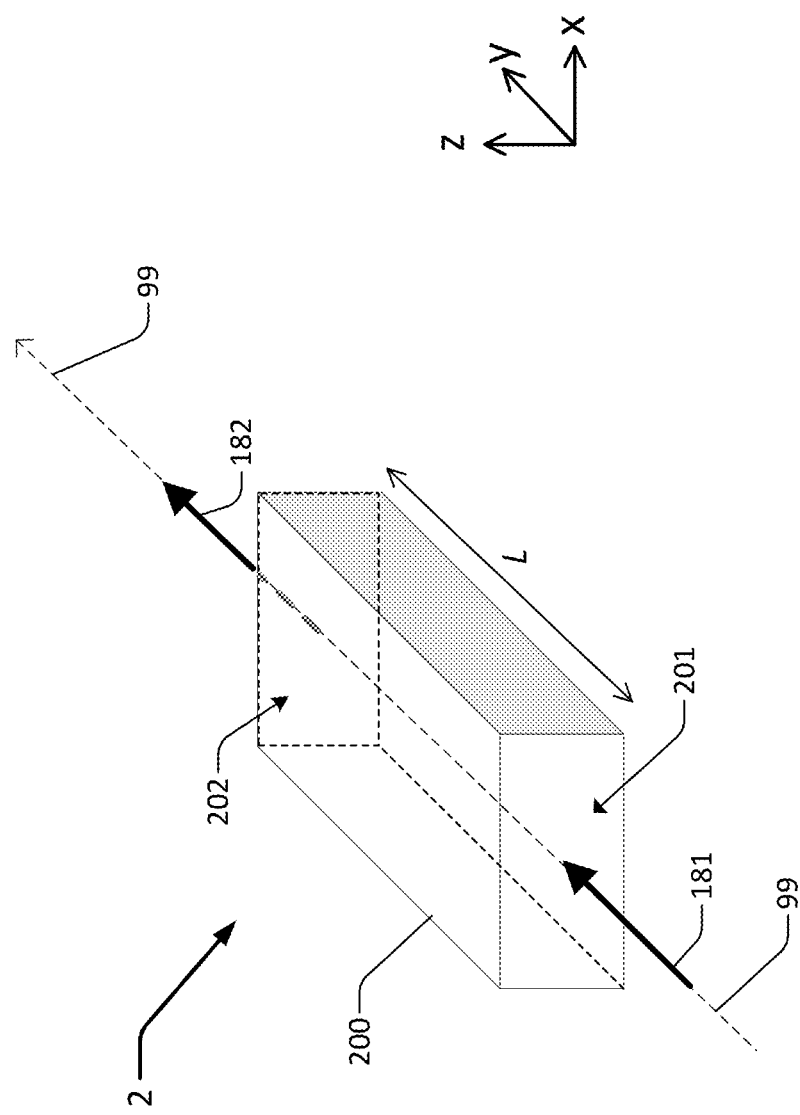
FIG. 3 illustrates a perspective view of the silicon-based electro-optic modulator of FIG. 2.

In some embodiments, the silicon-based E-O modulator 2 may be monolithically fabricated on a semiconductor substrate such as a silicon substrate or a silicon-on-insulator substrate. The silicon-based E-O modulator 2 may have a form of a slab, such as a slab 200 as shown in FIG. 3. Specifically, FIG. 3 shows a perspective view of the silicon-based E-O modulator 2 wholly embodied in the slab 200.

FIG. 3 also illustrates the optical signal passing through the silicon-based E-O modulator 2 along the main propagation direction 99. The arrow 181 in FIG. 2 and FIG. 3 represents the optical signal as the optical signal enters the silicon-based E-O modulator 2, and the arrow 182 in FIG. 2 and FIG. 3 represents the optical signal as the optical signal exits the silicon-based E-O modulator 2. Specifically, the arrow 181 in FIG. 3 represents the optical signal as the optical signal enters the silicon-based E-O modulator 2 at a front surface 201 of the slab 200, and the arrow 182 in FIG. 3 represents the optical signal as the optical signal exits the silicon-based E-O modulator 2 from a rear surface 202 of the slab 200. According to the Cartesian coordinates of FIG. 3, the main propagation direction 99 is substantially aligned with the y-axis direction.

Figure 4:
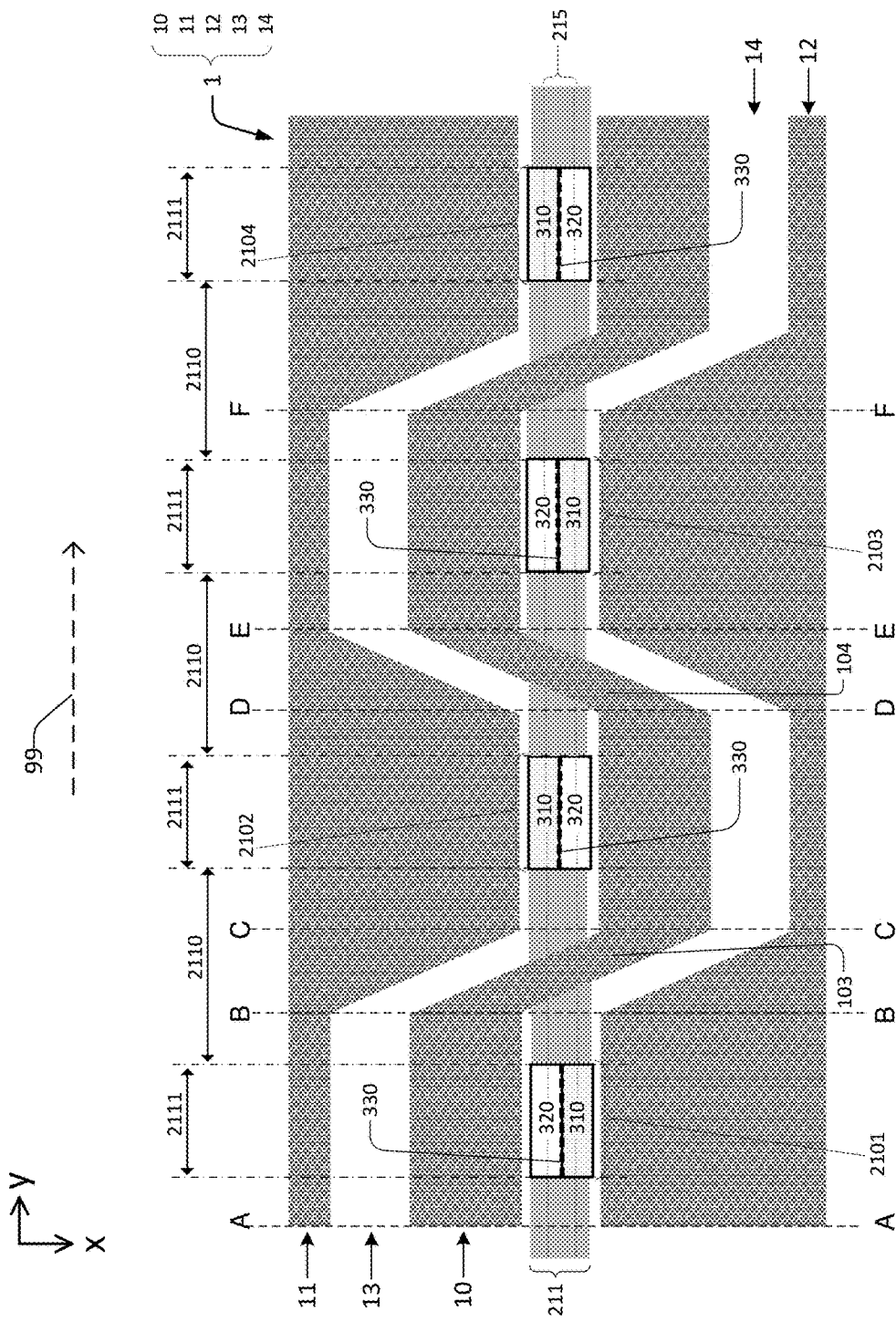
FIG. 4 illustrates a top view of a portion of a silicon-based electro-optic modulator comprising a curved coplanar waveguide transmission line according to one embodiment of the present disclosure.

FIG. 4 illustrates a top view of a portion of a silicon-based E-O modulator comprising a curved CPW transmission line according to one embodiment of the present disclosure, with the Cartesian coordinates of FIG. 3 also denoted in FIG. 4. Specifically, the top view of FIG. 4 is obtained by observing the slab 200 of FIG. 2 from the positive direction of the z-axis towards the negative direction of the z-axis. As shown in FIG. 4, the first optical arm 211 of the rib optical waveguide 21 extends in the slab 200 along the main propagation direction 99. Each of the first ground wire 11, the second ground wire 12, and the signal line 10 of the curved CPW transmission line 1 is configured to substantially extend along the main propagation direction 99. Also shown in FIG. 4 are a plurality of P-N junction diodes, including a P-N junction diode 2101, a P-N junction diode 2102, a P-N junction diode 2103, and a P-N junction diode 2104. As part of the rib optical waveguide 21, the P-N junction diodes 2101, 2102, 2103 and 2104 are arranged to align along the main propagation direction 99. Moreover, each of the plurality of P-N junction diodes 2101, 2102, 2103 and 2104 comprises a P-type semiconductor strip (e.g., a P-type semiconductor strip 310 of the P-N junction diode 2101, or a P-type semiconductor strip 310 of the P-N junction diode 2104) and an N-type semiconductor strip (e.g., an N-type semiconductor strip 320 of the P-N junction diode 2101, or an N-type semiconductor strip 320 of the P-N junction diode 2104). Each of the P-type semiconductor strips 310 and the N-type semiconductor strips 320 is longitudinally aligned along the main propagation direction 99. In addition, for each of the plurality of P-N junction diodes 2101-2104, the P-type semiconductor strip 310 and the N-type semiconductor strip 320 are arranged adjacent to one another, with a P-N junction 330 formed between the P-type semiconductor strip 310 and the N-type semiconductor strip 320. For the P-N junction diodes 2102 and 2104 that are located between the first ground wire 11 and the signal line 10, the first ground wire 11 is electrically coupled to the respective P-type semiconductor strip 310 of the P-N junction diodes 2102 and 2104, whereas the signal line 10 is electrically coupled to the respective N-type semiconductor strip 320 of the P-N junction diodes 2102 and 2104. That is, the first ground wire 11 is electrically coupled to the P-type semiconductor strip 310 of the P-N junction diode 2102 and the P-type semiconductor strip 310 of the P-N junction diode 2104, respectively, whereas the signal line 10 is electrically coupled to the N-type semiconductor strip 320 of the P-N junction diode 2102 and the N-type semiconductor strip 320 of the P-N junction diode 2104, respectively. Likewise, for the P-N junction diodes 2101 and 2103 that are located between the second ground wire 12 and the signal line 10, the second ground wire 12 is electrically coupled to the respective P-type semiconductor strip 310 of the P-N junction diodes 2101 and 2103, whereas the signal line 10 is electrically coupled to the respective N-type semiconductor strip 320 of the P-N junction diodes 2101 and 2103. That is, the second ground wire 12 is electrically coupled to the P-type semiconductor strip 310 of the P-N junction diode 2101 and the P-type semiconductor strip 310 of the P-N junction diode 2103, respectively, whereas the signal line 10 is electrically coupled to the N-type semiconductor strip 320 of the P-N junction diode 2101 and the N-type semiconductor strip 320 of the P-N junction diode 2103, respectively.

For each of the P-N junction diodes 2101-2104, a P-N polarity may be used to denote an orientation of the P-type semiconductor strip 310 of a P-N junction diode with respect to the N-type semiconductor strip 320 of the respective P-N junction diode. For example, a P-N junction diode may be defined to have a positive P-N polarity if its P-type semiconductor strip 310 is having a more positive x-axis coordinate than its N-type semiconductor strip 320. In contrast, a P-N junction diode may be defined to have a negative P-N polarity if its P-type semiconductor strip 310 is having a less positive x-axis coordinate than its N-type semiconductor strip 320. Following this denotation, each of the P-N junction diodes 2101 and 2103 of FIG. 4 has a positive P-N polarity, whereas each of the P-N junction diodes 2102 and 2104 of FIG. 4 has a negative P-N polarity. Namely, the P-N polarity of the P-N junction diodes 2102 and 2104 is opposite to that of the P-N junction diodes 2101 and 2103. Moreover, it is to be noted that the N-type semiconductor strips 320 of the P-N junction diodes 2101-2104 always correspond to the signal line 10, whereas the P-type semiconductor strips 310 always correspond to either the first ground wire 11 (e.g., for the P-N junction diodes located within the first groove 13, i.e., the P-N junction diodes 2102 and 2104) or the second ground wire 12 (e.g., for the P-N junction diodes located within the second groove 14, i.e., the P-N junction diodes 2101 and 2103). By the same token, in some other embodiments, the P-type semiconductor strips can be alternatively configured to always correspond to the signal line 10, whereas the N-type semiconductor strips 320 are instead configured to always correspond to the first ground wire 11 (e.g., for the P-N junction diodes located within the first groove 13) or the second ground wire 12 (e.g., for the P-N junction diodes located within the second groove 14). In either the embodiment shown in FIG. 4 or the alternative embodiments, the plurality of P-N junction diodes disposed along the main propagation direction 99 within the first optical arm 211 of the rib optical waveguide 21 are arranged in such a way that any two adjacent P-N junction diodes always exhibit opposite P-N polarities. Furthermore, each of the plurality of P-N junction diodes is biased by the electrical modulation signal, which is either a voltage difference between the first ground wire 11 and the signal line 10 (e.g., for the P-N junction diodes located within the first groove 13) or a voltage difference between the second ground wire 12 and the signal line 10 (e.g., for the P-N junction diodes located within the second groove 14).

Figure 5:
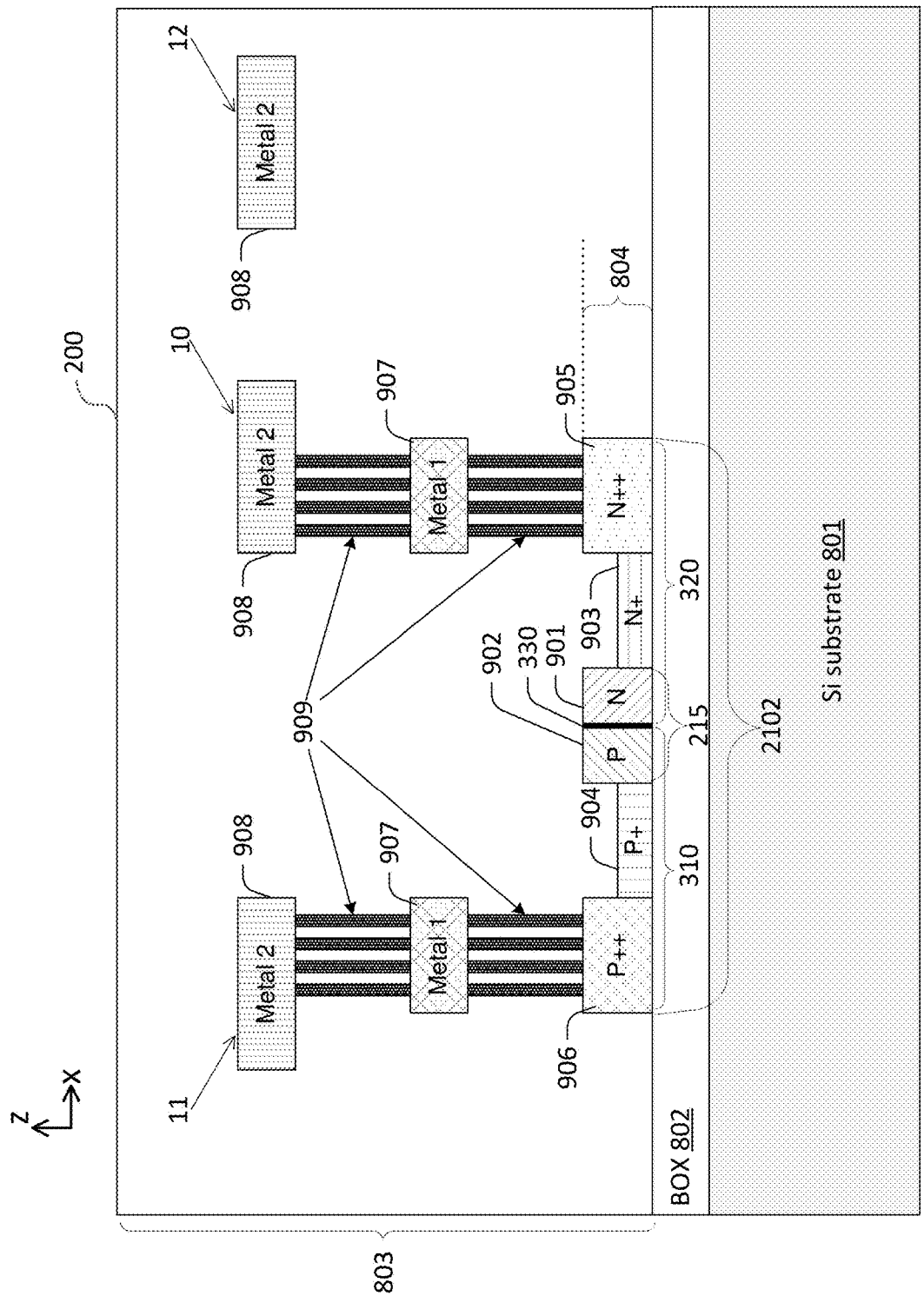
FIG. 5 illustrates a cross-sectional view of an active section of a silicon-based electro-optic modulator comprising a curved coplanar waveguide transmission line according to one embodiment of the present disclosure.
Figure 6:
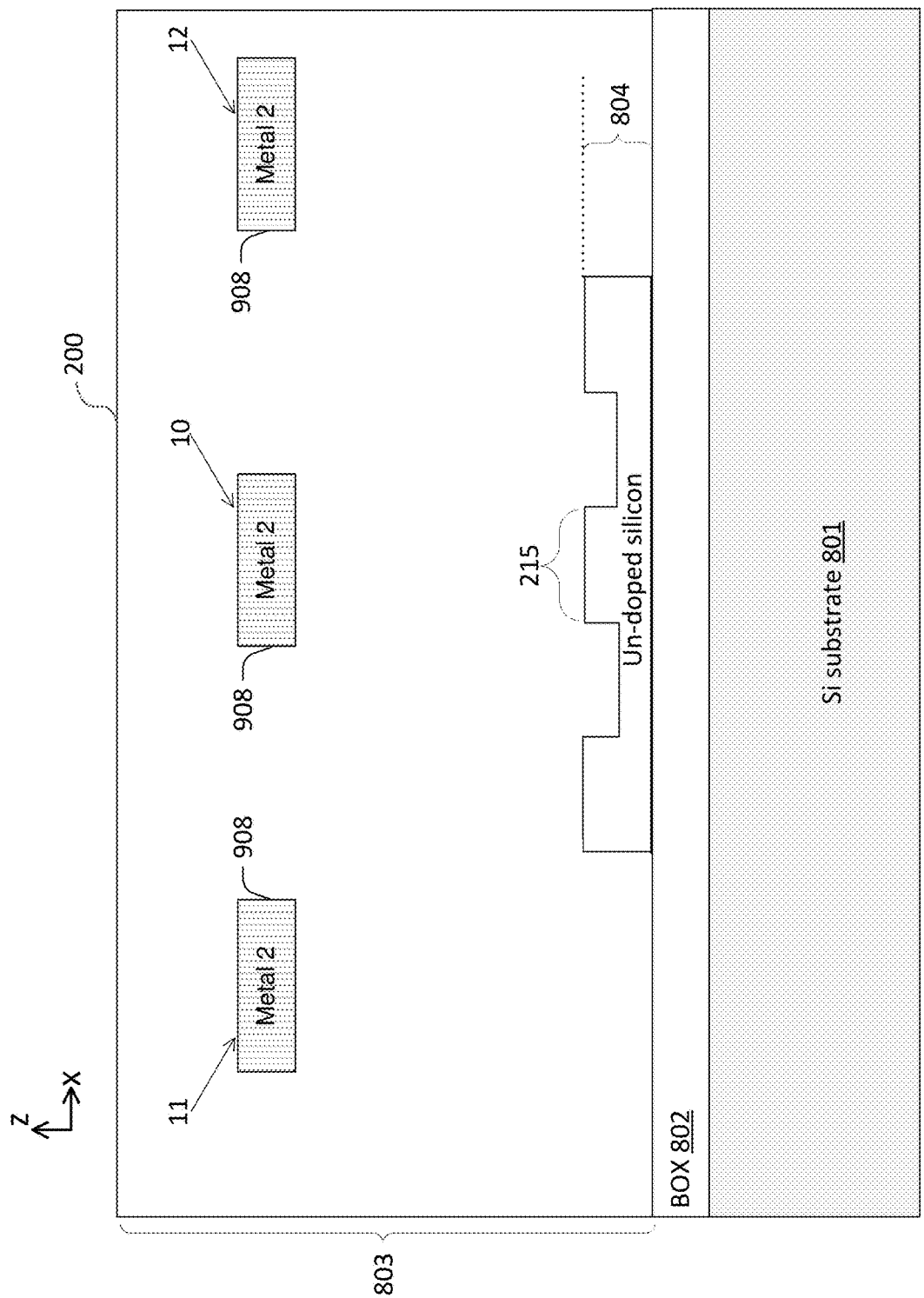
FIG. 6 illustrates a cross-sectional view of a passive section of a silicon-based electro-optic modulator comprising a curved coplanar waveguide transmission line according to one embodiment of the present disclosure.

The rib optical waveguide 21 has one or more physical features each called a "rib", which extends along the main propagation direction 99. Each "rib" is an elevated portion of the rib optical waveguide 21. As shown in FIG. 5 and FIG. 6, the rib optical waveguide 21 has a rib 215, which physically protrudes in the z-axis direction. That is, the portion of the rib optical waveguide 21 at the rib 215 is thicker in the z-axis direction than that outside the rib 215. Specifically, the part of the rib optical waveguide 21 located in the rib 215 is higher in the z-axis direction than that outside the rib 215. As shown in FIG. 4, each of the P-N junction diodes 2101, 2102, 2103 and 2104 has a corresponding P-N junction 330 located in the rib 215.

As shown in FIG. 4, the first optical arm 211 of the rib optical waveguide 21 comprises active sections 2111 and passive sections 2110. The rib 215 of the rib optical waveguide 21 extends through the active sections 2111 and the passive sections 2110. In some embodiments, each of the active sections 2111 may encompass one or more P-N junction diodes, whereas the passive sections 2110 do not encompass a P-N junction diode. As shown in FIG. 4, the active sections 2111 comprising the P-N junction diodes 2101 and 2103 are located in the second groove 14 that is formed between the second ground wire 12 and the signal line 10, wherein the active sections 2111 comprising the P-N junction diodes 2102 and 2104 are located in the first groove 13 that is formed between the first ground wire 11 and the signal line 10. The passive sections 2110 comprising no P-N junction diodes pass underneath (i.e., at a more negative z-axis coordinate compared with that of) the signal line 10 at the first transition section 103 and the second transition section 104 of the signal line 10. In an alternative embodiment of the present disclosure, the passive sections 2110 may cross above (i.e., at a more positive z-axis coordinate compared with that of) the first transition section 103 and the second transition section 104 of the signal line 10.

In some embodiments, the CPW transmission line 1 may be a slow-wave transmission line, which can reduce the transmission speed mismatch between the optical path and the electrical path of the silicon-based E-O modulator 2.

FIG. 5 illustrates a cross-sectional view of an active section of a silicon-based E-O modulator comprising a curved CPW transmission line according to one embodiment of the present disclosure. For example, FIG. 5 may represent a portion of an x-z-plane cross section along the slab 200 whereat an active section of the silicon-based E-O modulator 2 (i.e., one of the plurality of active sections 2111) is located. Specifically, FIG. 5 may represent an x-z plane cross section at the P-N junction diode 2102. As shown in FIG. 5, the slab 200 comprises a silicon-on-insulator (SOI) substrate, which includes a silicon substrate 801, a buried oxide layer (BOX) 802, and a top layer 803. The top layer 803 comprises a top silicon layer 804, a first metal layer 907, and a second metal layer 908, wherein the top silicon layer 804 comprises an N doped silicon region 901, a P doped silicon region 902, an N+ doped silicon region 903, a P+ doped silicon region 904, an N++ doped silicon region 905, and a P++ doped silicon region 906. In addition, conductive vias 909 provide an electrical connection between layers. As shown in FIG. 5, electrical coupling between the first metal layer 907 and the second metal layer 908, electrical coupling between the first metal layer 907 and the N++ doped silicon region 905, as well as electrical coupling between the first metal layer 907 and the P++ doped silicon region 906 are achieved by the conductive vias 909. The second metal layer 908 is configured to form various higher-level electrical conductors.

Each of the P-type semiconductor strips 310 comprises the P doped silicon region 902, the P+ doped silicon region 904, and the P++ doped silicon region 906. Similarly, each of the N-type semiconductor strips 320 comprises the N doped silicon region 901, the N+ doped silicon region 903, and the N++ doped silicon region 905. A P-N junction 330 is formed between the P doped silicon region 902 and the N doped silicon region 901.

As shown in FIG. 5, the N doped silicon region 901 and the P doped silicon region 902 are disposed adjacent to one another. The N+ doped silicon region 903 is disposed side-by-side with, and adjacent to, the N doped silicon region 901, with the P doped silicon region 902 located on the other side of the N doped silicon region 901. The P+ doped silicon region 904 is disposed side-by-side with, and adjacent to, the P doped silicon region 902, with the N-doped silicon region 901 located on the other side of the P doped silicon region 902. The N++ doped silicon region 905 is disposed side-by-side with, and adjacent to, the N+ doped silicon region 903, with the N-doped silicon region 901 located on the other side of the N+ doped silicon region 903. The P++ doped silicon region 906 is disposed side-by-side with, and adjacent to, the P+ doped silicon region 904, with the P doped silicon region 902 located on the other side of the P+ doped silicon region 904. The N-doped silicon region 901, the P doped silicon region 902, the N+ doped silicon region 903, the P+ doped silicon region 904, the N++ doped silicon region 905, and the P++ doped silicon region 906 are formed in the top silicon layer 804 and located on the same side of the buried oxide layer 802.

Each of the N-doped silicon region 901, the P-doped silicon region 902, the N+ doped silicon region 903, the P+ doped silicon region 904, the N++ doped silicon region 905, and the P++ doped silicon region 906 may be formed by implanting a corresponding N-type or P-type dopant of a specific ion concentration in a corresponding region of the top silicon layer 804. In addition, each layer or doped region shown in FIG. 5 may have a preferred thickness range. In some embodiments of the present disclosure, the N doped silicon region 901 and the P doped silicon region 902 may have a thickness in a range of 100-500 nanometers (nm), with a doping concentration in the range of 1e17-1e18 per cubic centimeter ($cm^{-3}$). In some embodiments, the N+ doped silicon region 903 and the P+ doped silicon region 904 may have a thickness in a range of 70-320 nm, with a doping concentration of in a range of 1e18-5e18 $cm^{-3}$. In some embodiments, the N++ doped silicon region 905 and the P++ doped silicon region 906 may have a thickness in a range of 150-400 nm, with a doping concentration of in a range of 1e19-1e22 $cm^{-3}$. The material of the first metal layer 907 and the second metal layer 908 may comprise conductive metals, alloys, or other conductive materials such as aluminum-copper (Al—Cu) alloy. In some embodiments, the thickness of the first metal layer 907 is in a range of 0.3-1 um, and the thickness of the second metal layer 908 is in a range of 1-3 um. In some embodiments, the thickness of the buried oxide layer 802 is in a range of 2-4 um. The N doped silicon region 901 and the P doped silicon region 902 together form the rib 215 of the rib optical waveguide 21.

According to an alternative embodiment of the present invention, the rib optical waveguide 21 has a height in a range of 100-500 nm, and a width in a range of 300-700 nm.

FIG. 6 illustrates a cross-sectional view of a passive section of a silicon-based E-O modulator comprising a curved CPW transmission line according to one embodiment of the present disclosure. For example, FIG. 6 may represent a portion of an x-z-plane cross section along the slab 200 whereat an passive section of the silicon-based E-O modulator 2 (i.e., one of the plurality of passive sections 2110) is located. The top silicon layer 804 of FIG. 6 is un-doped, i.e., not doped with any P-type or N-type dopant at any ion concentration. The cross-sectional profile of the un-doped top silicon layer 804 is the same as that of the aggregated area composed of the N doped silicon region 901, the P doped silicon region 902, the N+ doped silicon region 903, P+ doped silicon region 904, the N++ doped silicon region 905, and the P++ doped silicon region 906 of in FIG. 5.

Figure 7:
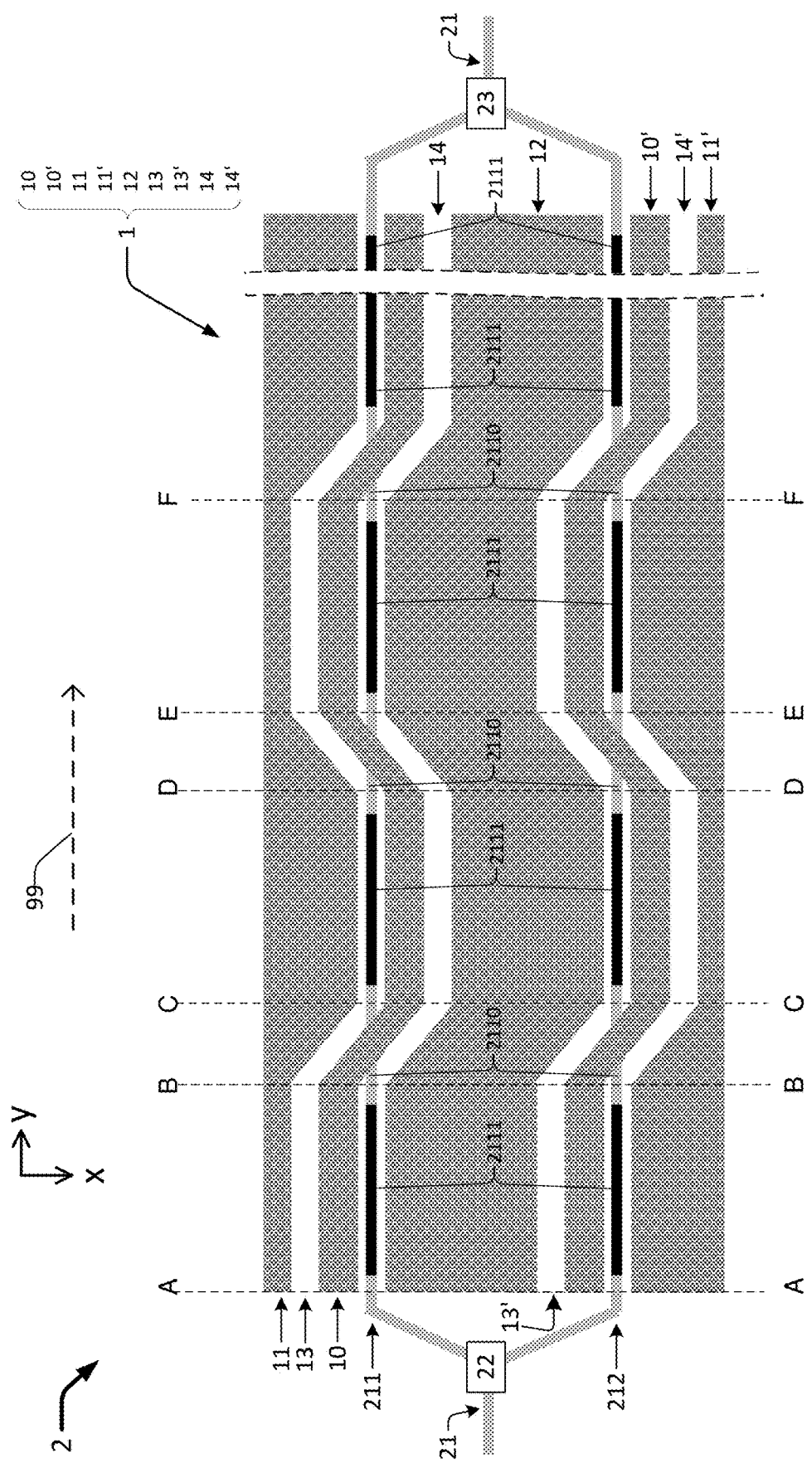
FIG. 7 illustrates a schematic view of another silicon-based electro-optic modulator comprising a curved coplanar waveguide transmission line according to one embodiment of the present disclosure.

FIG. 7 illustrates a schematic view of a silicon-based E-O modulator 2 comprising a curved CPW transmission line according to an alternative embodiment of the present disclosure. As shown in FIG. 7, the first optical arm 211 and the second optical arm 212 of the rib optical waveguide 21 respectively extend through the curved CPW transmission line 1. It is easy to understand that the CPW transmission line 1 shown in FIG. 7 may be formed by two instances of the CPW transmission line 1 of FIG. 4. It is also easy to understand that, in order to form the CPW transmission line 1 of FIG. 7, the two instances of the CPW transmission line 1 of FIG. 4 are connected as an integral part, with the second ground wire 12 of a first of the two instances joined or otherwise overlapped with the first ground wire 11 of a second of the two instances, resulting in the curved CPW transmission line 1 of FIG. 7 having two signal lines (i.e., signal lines 10 and 10') and three ground wires (i.e., ground wires 11, 12 and 11'). Moreover, in addition to the first groove 13 and the second groove 14, the curved CPW transmission line 1 of FIG. 7 further comprises a third groove 13' and the fourth groove 14'.

Various embodiments presented above disclose a CPW transmission line having a curved shape, such that the plurality of active sections of the rib optical waveguide are arranged evenly distributed on both sides of the CPW transmission line. The arrangement suppresses undesired transmission modes that could have been caused or triggered by the otherwise imbalance of the conventional CPW transmission line, thereby avoiding an increased length of transmission path of the rib optical waveguide. This in turn reduces the transmission speed mismatch of the E-O modulator, achieving high-speed operation of the silicon-based E-O modulator.

Characteristics and benefits of the present disclosure are described with reference to various embodiments detailed above. Accordingly, the present disclosure should not be limited to these exemplary embodiments illustrating combinations of some possible unlimiting features that may exist individually or in the form of other combinations of features.

The embodiments described above are merely demonstrate certain exemplary embodiments of the present disclosure, which are used to illustrate the technical solution of the problem to be addressed, rather than to limit the present disclosure in any way. The protection scope of the present disclosure is not limited to the exemplary embodiments. Although the present disclosure has been described in detail with reference to the above-mentioned embodiments, a person skilled in the art should understand that any person familiar with the technical solution disclosed in the present disclosure is able to modify or change the technical solution recorded in the above-mentioned embodiments, and equally replace some technical features of the present invention. Nevertheless, these modifications, changes and substitutions do not separate the essence of the corresponding technical solutions from the spirit and scope of the technical solutions of the present disclosure, and are covered in the protection scope of the present application. Therefore, the protection scope of the present application shall be subject to the protection scope of the claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A coplanar waveguide (CPW) transmission line, comprising:
　a first ground wire, comprising:
　　a first active section of the first ground wire;
　　a second active section of the first ground wire;
　　a first transition section of the first ground wire, the first transition section of the first ground wire coupling the first active section of the first ground wire with the second active section of the first ground wire; and
　　a second transition section of the first ground wire, the second transition section of the first ground wire coupling the second active section of the first ground wire with a next first active section of the first ground wire,
　　wherein the first active section of the first ground wire, the second active section of the first ground wire, the first transition section of the first ground wire and the second transition section of the first ground wire are arranged to extend periodically and repeatedly through the first ground wire;
　a signal line, comprising:
　　a first active section of the signal line;
　　a second active section of the signal line;
　　a first transition section of the signal line coupling the first active section of the signal line with the second active section of the signal line; and
　　a second transition section of the signal line coupling the second active section of the signal line with a next first active section of the signal line,
　　wherein the first active section of the signal line, the second active section of the signal line, the first transition section of the signal line and the second transition section of the signal line are arranged to extend periodically and repeatedly through the signal line and configured to collectively present the signal line in a curved or winding shape;
　a second ground wire, comprising:
　　a first active section of the second ground wire;
　　a second active section of the second ground wire;
　　a first transition section of the second ground wire, the first transition section of the second ground wire coupling the first active section of the second ground wire with the second active section of the second ground wire; and
　　a second transition section of the second ground wire, the second transition section of the second ground wire coupling the second active section of the second ground wire with a next first active section of the second ground wire,
　　wherein the first active section of the second ground wire, the second active section of the second ground wire, the first transition section of the second ground wire and the second transition section of the second ground wire are arranged to extend periodically and repeatedly through the second ground wire;
　a first groove formed between the first ground wire and the signal line, comprising:
　　a first active section of the first groove;
　　a second active section of the first groove;
　　a first transition section of the first groove, the first transition section of the first groove coupling the first active section of the first groove with the second active section of the first groove; and
　　a second transition section of the first groove, the second transition section of the first groove coupling the second active section of the first groove with a next first active section of the first groove,
　　wherein the first active section of the first groove, the second active section of the first groove, the first transition section of the first groove and the second transition section of the first groove are arranged to extend periodically and repeatedly through the first groove and configured to collectively present the first groove in the curved or winding shape; and
　a second groove formed between the second ground wire and the signal line, comprising:
　　a first active section of the second groove;
　　a second active section of the second groove;
　　a first transition section of the second groove, the first transition section of the second groove coupling the first active section of the second groove with the second active section of the second groove; and
　　a second transition section of the second groove, the second transition section of the second groove coupling the second active section of the second groove with a next first active section of the second groove,
　　wherein the first active section of the second groove, the second active section of the second groove, the first transition section of the second groove and the second transition section of the second groove are arranged to extend periodically and repeatedly through the second groove and configured to collectively present the second groove in the curved or winding shape, and
　　wherein the curved or winding shape comprises a general S shape or a general Z shape.

2. The CPW transmission line of claim 1, wherein the first active section of the first ground wire, the first active section of the first groove, the first active section of the signal line, the first active section of the second groove, and the first active section of the second ground wire are substantially aligned with each other, and wherein the first active section of the second ground wire protrudes towards the first active section of the signal line such that a width of the first active section of the first groove is substantially equal to a width of the first active section of the second groove.

3. The CPW transmission line of claim 1, wherein the second active section of the first ground wire, the second active section of the first groove, the second active section of the signal line, the second active section of the second groove, and the second active section of the second ground wire are substantially aligned with each other, and wherein the second active section of the first ground wire protrudes towards the second active section of the signal line such that a width of the second active section of the first groove is substantially equal to a width of the second active section of the second groove.

4. The CPW transmission line of claim 1, wherein the first transition section of the first ground wire, the first transition section of the first groove, the first transition section of the signal line, the first transition section of the second groove, and the first transition section of the second ground wire are substantially aligned with each other, and wherein a width of the first transition section of the first groove is substantially equal to a width of the first transition section of the second groove.

5. The CPW transmission line of claim 1, wherein the second transition section of the first ground wire, the second transition section of the first groove, the second transition section of the signal line, the second transition section of the second groove, and the second transition section of the second ground wire are substantially aligned with each other, and wherein a width of the second transition section of the first groove is substantially equal to a width of the second transition section of the second groove.

6. A silicon-based electro-optic (E-O) modulator, comprising:
   a coplanar waveguide (CPW) transmission line, comprising:
      a first ground wire;
      a second ground wire;
      a signal line disposed between the first ground wire and the second ground wire, the signal line having a curved or winding shape that comprises a general S shape or a general Z shape;
      a first groove formed between the first ground wire and the signal line, the first groove comprising a first active section and a second active section and having the curved or winding shape; and
      a second groove formed between the second ground wire and the signal line, the second groove comprising a first active section and a second active section and having the curved or winding shape;
   a rib optical waveguide having a first optical arm and a second optical arm and configured to transmit an optical signal substantially traveling along a main propagation direction;
   a beam splitter configured to split the optical signal into two beams which are respectively transmitted through the first optical arm and the second optical arm; and
   a beam combiner configured to combine the two beams transmitted in the first optical arm and the second optical arm into one beam,
   wherein:
      at least one of the first optical arm and the second optical arm comprises a plurality of active sections and a plurality of passive sections, each of the plurality of active sections and each of the plurality of passive sections being arranged alternately along the main propagation direction,
      the at least one of the first optical arm and the second optical arm extends through the first groove and the second groove of the CPW transmission line alternately, and
      each of the plurality of active sections is respectively arranged in the first groove and the second groove alternately.

7. The silicon-based E-O modulator of claim 6, further comprising a silicon-on-insulator substrate comprising a silicon substrate, a buried oxide layer and a top silicon layer.

8. The silicon-based E-O modulator of claim 6, wherein the beam splitter is a multi-mode interferometer or a Y-branch structure, and wherein the beam combiner is a multi-mode interferometer or a Y-branch structure.

9. The silicon-based E-O modulator of claim 6, wherein each of the plurality of active sections comprises at least one P-N junction or at least one metal-oxide-semiconductor (MOS) capacitor, and wherein the plurality of passive sections comprises neither a P-N junction nor a MOS capacitor.

10. The silicon-based E-O modulator of claim 9, wherein each of the plurality of active sections comprises a P-N junction diode comprising a P-type semiconductor strip and an N-type semiconductor strip, and wherein any two adjacent P-N junction diodes within the at least one of the first optical arm and the second optical arm exhibit opposite P-N polarities.

11. The silicon-based E-O modulator of claim 10, wherein:
   the N-type semiconductor strip corresponds to the signal line,
   in an event that the P-N junction diode is located within the first groove, the P-type semiconductor strip corresponds to the first ground wire, and
   in an event that the P-N junction diode is located within the second groove, the P-type semiconductor strip corresponds to the second ground wire.

12. The silicon-based E-O modulator of claim 10, wherein:
   the P-type semiconductor strip corresponds to the signal line,
   in an event that the P-N junction diode is located within the first groove, the N-type semiconductor strip corresponds to the first ground wire, and
   in an event that the P-N junction diode is located within the second groove, the N-type semiconductor strip corresponds to the second ground wire.

* * * * *